(12) United States Patent
Lee et al.

(10) Patent No.: US 8,345,752 B2
(45) Date of Patent: Jan. 1, 2013

(54) METHOD AND APPARATUS FOR ENTROPY ENCODING/DECODING (75) Inventors: Bae-Keun Lee, Bucheon-si (KR); Kyo-Hyuk Lee, Yongin-si (KR); Woo-Jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1318 days.

(21) Appl. No.: 11/780,990

(22) Filed: Jul. 20, 2007

(65) Prior Publication Data

US 2008/0080620 A1  Apr. 3, 2008

Related U.S. Application Data (60) Provisional application No. 60/831,936, filed on Jul. 20, 2006.

(30) Foreign Application Priority Data

Sep. 11, 2006 (KR) ........................ 10-2006-0087546

(51) Int. Cl.
*H04N 7/12* (2006.01)
(52) U.S. Cl. ................ 375/240.1; 375/240; 375/240.01; 375/240.08; 382/232; 382/244; 382/246; 382/247
(58) Field of Classification Search .................. 375/240, 375/240.01, 240.08, 240.1; 382/232, 244, 382/246, 247
See application file for complete search history.

(56) References Cited

U.S. PATENT DOCUMENTS

| | | | |
|---|---|---|---|
| 6,275,531 B1 | 8/2001 | Li | |
| 6,580,832 B1 * | 6/2003 | Kim et al. ..................... | 382/243 |
| 6,639,943 B1 * | 10/2003 | Radha et al. ............. | 375/240.11 |
| 6,788,740 B1 * | 9/2004 | van der Schaar et al. ..... | 375/240 |
| 6,944,639 B2 * | 9/2005 | Launiainen .................. | 708/270 |
| 7,406,176 B2 * | 7/2008 | Zhu et al. ..................... | 380/200 |
| 7,586,425 B2 * | 9/2009 | Ridge et al. ..................... | 341/67 |
| 2004/0017949 A1 * | 1/2004 | Lin et al. ........................ | 382/232 |
| 2004/0066974 A1 * | 4/2004 | Karczewicz et al. ......... | 382/239 |
| 2004/0240742 A1 | 12/2004 | Takahashi et al. | |
| 2005/0094731 A1 * | 5/2005 | Xu et al. .................. | 375/240.19 |
| 2005/0185714 A1 * | 8/2005 | Lin et al. .................. | 375/240.12 |
| 2006/0078049 A1 * | 4/2006 | Bao et al. ................. | 375/240.11 |
| 2006/0083309 A1 * | 4/2006 | Schwarz et al. ......... | 375/240.16 |

(Continued)

OTHER PUBLICATIONS

Communication from the Tawain Intellectual Property Office dated Sep. 29, 2011, in counterpart Taiwanese Application No. 96126582.

(Continued)

*Primary Examiner* — Nathan Flynn
*Assistant Examiner* — Sarah Su
(74) *Attorney, Agent, or Firm* — Sughrue Mion, PLLC (57) ABSTRACT A method and apparatus are provided for performing entropy encoding on a fine granular scalability layer. A method of entropy encoding on a plurality of current coefficients of a quality layer among a plurality of quality layers of an image block divided into the plurality of quality layers, includes determining a coding pass with respect to each of the current coefficients, selecting a context model with respect to each of the current coefficients using at least one lower coefficient corresponding to each of the current coefficients if the coding pass is a refinement pass, and performing arithmetic encoding a group of coefficients having a same selected context model among the current coefficients by using the selected context model.

24 Claims, 10 Drawing Sheets

U.S. PATENT DOCUMENTS

| | | | |
|---|---|---|---|
| 2006/0153294 A1 | 7/2006 | Wang et al. | |
| 2007/0014349 A1* | 1/2007 | Bao et al. | 375/240.1 |
| 2007/0014351 A1* | 1/2007 | Lee et al. | 375/240.03 |
| 2007/0053425 A1* | 3/2007 | Ridge et al. | 375/240 |
| 2007/0053426 A1* | 3/2007 | Lee et al. | 375/240 |
| 2007/0069926 A1* | 3/2007 | Lee et al. | 341/67 |
| 2007/0071088 A1* | 3/2007 | Lee et al. | 375/240.1 |
| 2007/0133676 A1* | 6/2007 | Lee et al. | 375/240.1 |
| 2007/0177664 A1* | 8/2007 | Lee | 375/240.1 |
| 2007/0201550 A1* | 8/2007 | Wang et al. | 375/240.1 |
| 2007/0201551 A1* | 8/2007 | Wang et al. | 375/240.1 |
| 2007/0223580 A1* | 9/2007 | Ye et al. | 375/240.12 |
| 2007/0223825 A1* | 9/2007 | Ye et al. | 382/240 |
| 2007/0230811 A1* | 10/2007 | Lee | 382/244 |
| 2007/0237240 A1* | 10/2007 | Lee et al. | 375/240.24 |
| 2008/0013624 A1* | 1/2008 | Han | 375/240.1 |
| 2008/0025399 A1* | 1/2008 | Le Leannec et al. | 375/240.16 |
| 2009/0304091 A1* | 12/2009 | Park et al. | 375/240.26 |
| 2011/0293019 A1* | 12/2011 | Steinberg et al. | 375/240.25 |
| 2012/0189049 A1* | 7/2012 | Coban et al. | 375/240.02 |

OTHER PUBLICATIONS

Wen-Hsiao Peng, "Adding Selective Enhancement Functionality to Scalable Video Coding" JVT-0020, 15th meeting of Joint Video Team (JVT) of ISO/IEC MPEG & ITU-T VCEG, Busan, See pp. 1-4, Apr. 2005.

* cited by examiner

METHOD AND APPARATUS FOR ENTROPY ENCODING/DECODING

CROSS REFERENCE TO RELATED APPLICATION

This application claims priority from Korean Patent Application No. 10-2006-0087546 filed on Sep. 11, 2006 in the Korean Intellectual Property Office, and U.S. Provisional Patent Application No. 60/831,936 filed on Jul. 20, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to video compression, and more particularly, to increasing encoding efficiency when performing entropy encoding on a fine granular scalability layer.

2. Description of the Related Art

With the development of information communication technology including the Internet, video communication as well as text and voice communication has increased. Conventional text communication cannot satisfy users' various demands, and thus, multimedia services that can provide various types of information such as text, pictures, and music have increased. However, multimedia data requires a large-capacity storage medium and a wide bandwidth for transmission because the amount of multimedia data is usually large. Accordingly, a compression coding method is requisite for transmitting multimedia data including text, video, and audio.

A basic principle of data compression is to remove data redundancy. Data can be compressed by removing spatial redundancy in which the same color or object is repeated in an image, temporal redundancy in which there is little change between adjacent frames in a moving image or the same sound is repeated in audio, or mental visual redundancy which takes into account human eyesight and its limited perception of high frequency. In a general video coding method, the temporal redundancy is removed by temporal filtering based on motion compensation, and the spatial redundancy is removed by spatial transform.

Lossy encoding is performed on the result obtained by removing data redundancy according to predetermined quantization steps through a quantization process. Lossless encoding is finally performed on the quantized result through entropy encoding.

Currently, in the scalable video coding (SVC) standard that is being conducted by a joint video team (JVT), which is a meeting between video experts of the International Organization for Standardization/International Electro technical Commission (ISO/IEC) and the International Telecommunication Union (ITU), research on a multi-layer based scalable video coding technique based on the conventional H.264 standard has been actively made. In particular, an FGS technique is used to improve quality or bit rate of one frame.

Figure 1:
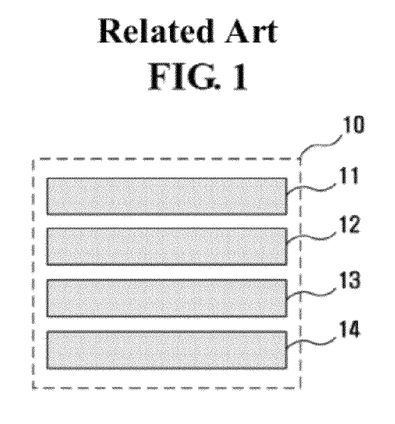
FIG. 1 is a view illustrating the concept of a plurality of quality layers that form one frame or slice.

FIG. 1 is a view illustrating the concept of a plurality of quality layers 11, 12, 13, and 14 that form one frame or slice 10 (hereinafter, referred to as "slice"). The quality layers are data that is obtained by dividing one slice and being recorded so as to support signal-to-noise ratio (SNR) scalability. An FGS layer is a representative example for the quality layer, but the invention is not limited thereto. The plurality of quality layers may include one base layer and one or more FGS layers 11, 12, and 13. Video quality measured by a video decoder becomes improved in order of when only the base layer 14 is received, when the base layer 14 and the first FGS layer 13 are received, when the base layer 14, the first FGS layer 13, and the second FGS layer 12 are received, and when all of the layers 11, 12, 13, and 14 are received.

In the SVC draft, the coding is performed using correlation between the respective FGS layers. That is, another FGS layer is coded using coefficients of one FGS layer according to separated coding passes (the concept including a significant pass and a refinement pass). At this time, when coefficients of all of the corresponding lower layers are zero, coefficients of the corresponding current layer are coded by the significant pass. When one or more coefficients of the corresponding lower layers do not have values of zero, the coefficients of the corresponding current layer are coded by the refinement pass. As such, predetermined coefficients of the FGS layers are coded by the different passes because probability distributions of the coefficients are clearly differentiated from each other according to the coefficients of the corresponding lower layers.

Figure 2A:
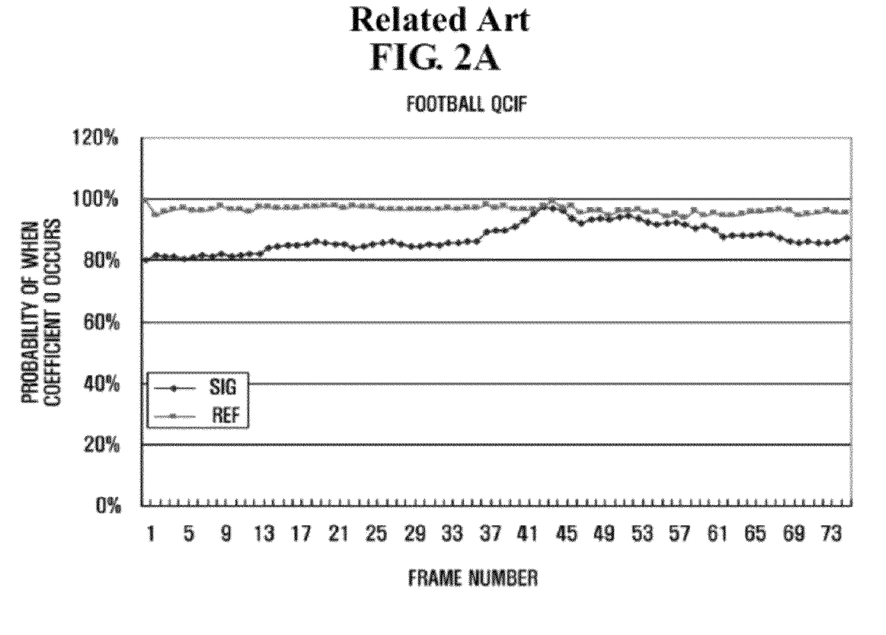
FIG. 2A is a graph illustrating probability of when a zero occurs with respect to corresponding coding passes when the coding passes of a first FGS layer are selected by using coefficients of a discrete layer.

FIG. 2A is a graph illustrating probability of when a zero occurs with respect to corresponding coding passes when coding passes of the first FGS layer are selected by using coefficients of the discrete layer In FIG. 2A, SIG denotes a significant pass, and REF denotes a refinement pass. Referring to FIG. 2A, a probability distribution, in which a zero occurs in the coefficients of the first FGS layer that are coded by the significant pass because the corresponding coefficients of the discrete layer are zero, is clearly differentiated from a probability distribution, in which a zero occurs in the coefficients of the first FGS layer that are coded by the refinement pass because the corresponding coefficients of the discrete layer are not zero. As such, when probability distributions, in which a zero occurs, are clearly differentiated from each other, the coding efficiency can be improved by performing the coding according to the different coding passes, that is, according to different context models.

Figure 2B:
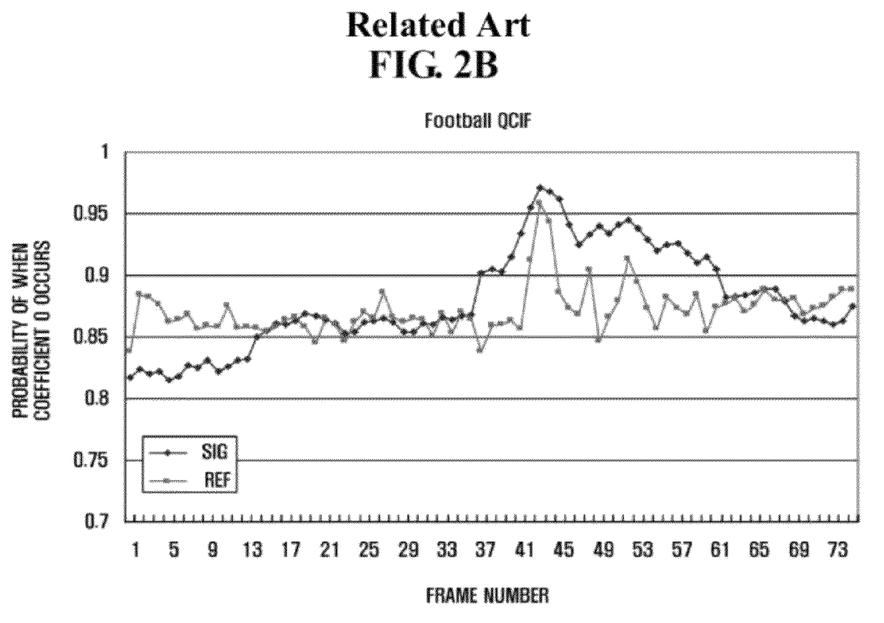
FIG. 2B is a graph illustrating probability of when a zero occurs with respect to corresponding coding passes when the coding passes of a second FGS layer are selected by using coefficients of a discrete layer and a first FGS layer.

FIG. 2B is an exemplary graph illustrating probability of when a zero occurs with respect to corresponding coding passes when the coding passes of the second FGS layer are selected by using the coefficients of the discrete layer and the first FGS layer. Referring to FIG. 2B, unlike the FIG. 2A, probabilities of when a zero occurs between the coefficients of the second FGS layer, which are coded by the refinement pass, and the coefficients of the second FGS layer, which are coded by the significant pass, are not differentiated from each other, but the probabilities are mixed. That is, the coding method according to coding passes, which is disclosed in the SVC draft, is considerably efficient for the coding of the first FGS layer. However, when the coding is performed on the second FGS layer or upper layers, the efficiency may be reduced. The reduction in efficiency may be caused by the fact that probable correlation between adjacent layers is high but probable correlation between layers, which are not adjacent but slightly distant from each other, is low.

SUMMARY OF THE INVENTION

The present invention provides a method and apparatus for entropy encoding/decoding that can improve entropy coding efficiency of video data that includes a plurality of quality layers.

The present invention also provides a method and apparatus for entropy encoding/decoding that can reduce computational complexity when performing entropy coding on video data that includes a plurality of quality layers.

According to an aspect of the present invention, there is provided a method of entropy encoding on at least one current coefficient of a predetermined quality layer among a plurality of quality layers when an image block is divided into the plurality of quality layers, the method including determining a coding pass with respect to each of the current coefficients, selecting a context model with respect to each of the current coefficients using at least one lower coefficient corresponding to each of the current coefficients when the coding pass is a refinement pass, and performing arithmetic encoding on a group of coefficients having the same selected context model among the current coefficients by using the selected context model.

According to another aspect of the present invention, there is provided a method of entropy decoding on at least one encoded current coefficient of a predetermined quality layer among a plurality of quality layers when an image block is divided into the plurality of quality layers, tire method including determining a coding pass with respect to each of the encoded current coefficients, selecting a context model with respect to each of the encoded current coefficients using at least one lower coefficient corresponding to each of the encoded current coefficients when the coding pass is a refinement pass, and performing arithmetic decoding on a group of coefficients having the same selected context model among the encoded current coefficients by using the selected context model.

According to another aspect of the present invention, there is provided a method of entropy encoding on at least one current coefficient of a predetermined quality layer among a plurality of quality layers when an image block is divided into the plurality of quality layers, the method including determining a coding pass with respect to each of the current coefficients, selecting a variable length coding (VLC) with respect to the current coefficients according to each of the current coefficients using at least one lower coefficient corresponding to each of the current coefficients when the coding pass is a refinement pass, and performing variable length encoding on a group of coefficients having the same selected context model among the current coefficients by using the selected VLC table.

According to another aspect of the present invention, there is provided a method of entropy decoding on at least one encoded current coefficient of a predetermined quality layer among a plurality of quality layers when an image block is divided into the plurality of quality layers, the method including determining a coding pass with respect to each of the encoded current coefficient; selecting a VLC table with respect to each of the encoded current coefficients using at least one lower coefficient corresponding to each of the encoded current coefficients when the coding pass is a refinement pass, and performing variable length decoding on a group of coefficients having the same selected context model among the encoded current coefficients by using the selected VLC table.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3:
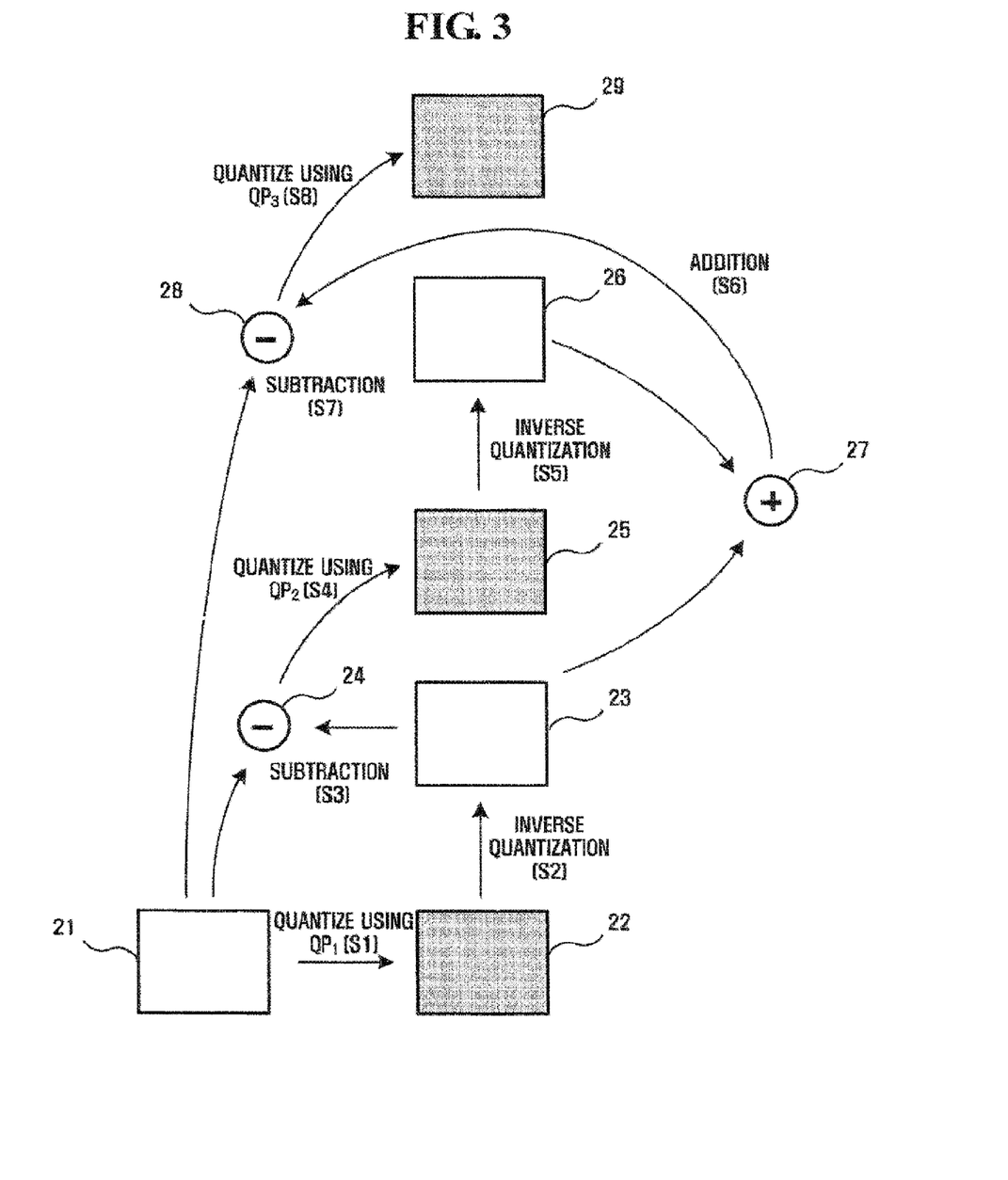
FIG. 3 is a view illustrating a process in which one slice is expressed as one base layer and two FGS layers.

FIG. 3 is a view illustrating a process in which one slice is expressed as one base layer and two FGS layers. In the beginning, an original slice 21 is quantized by a first quantization parameter $QP_1$ (S1). The quantized slice 22 forms a base layer. The quantized slice 22 is inversely quantized (S2) and supplied to a subtracter 24. The subtracter 24 subtracts the slice 23 supplied from the original slice (S3). The subtracted result is quantized by a second quantization parameter $QP_2$ (S4). The quantized result 25 forms a first FGS layer.

Figure 4:
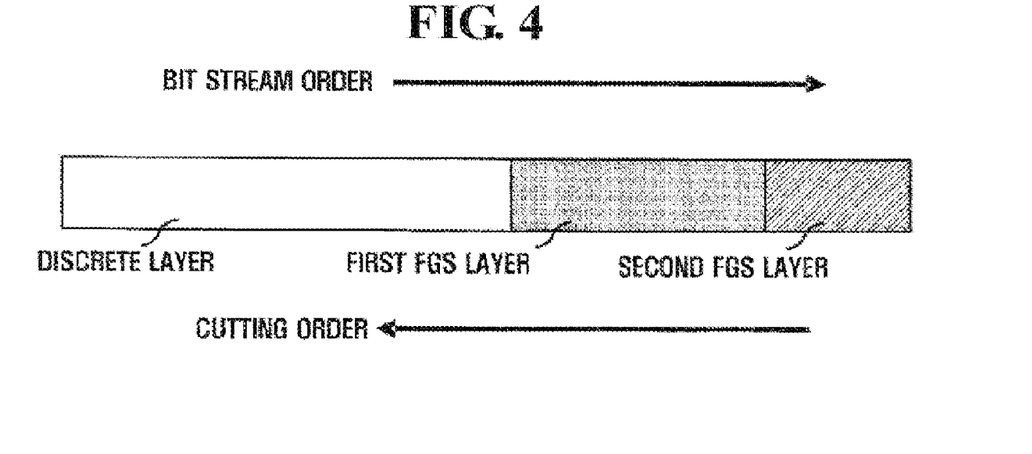
FIG. 4 is a view illustrating an example in which a plurality of quality layers are arranged in a bit stream.

The quantized result 25 is inversely quantized (S5) and the inversely quantized result 26 is added to the inversely quantized slice 23 by an adder 27 (S6) and then supplied to a subtracter 28. The subtracter 28 subtracts the added result from the original slice (S7). The subtracted result is quantized by a third quantization parameter $QP_3$ (S8). The quantized result 29 forms a second FGS layer. Through this process, a plurality of quality layers shown in FIG. 1 may be formed. Here, except for the discrete layer, each of the first FGS layer and the second FGS layer has a structure (see FIG. 4) in which arbitrary bits can be removed from each layer. To this end, a bit plane coding scheme used in the conventional MPBG-4, a cyclic FGS coding scheme used in the SVC draft, or the like may be applied to each of the FGS layers.

Figure 5:
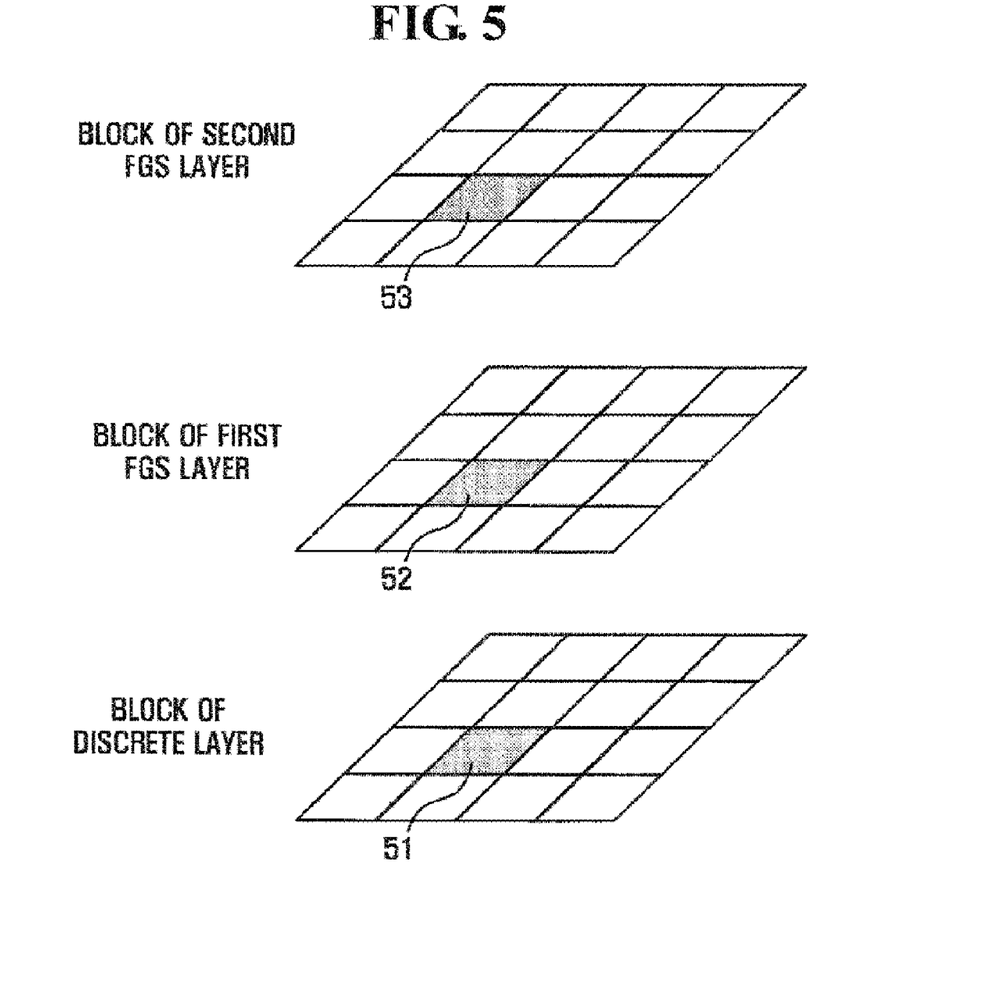
FIG. 5 is a view illustrating coefficients that spatially correspond to each other in a plurality of quality layers.

As described above, in the current SVC draft, coding passes of coefficients in a predetermined FGS layer are determined by using corresponding coefficients of all layers that are located below the predetermined FGS layer. Here, the "corresponding coefficients" indicate coefficients that have the same spatial position between, the plurality of quality layers. For example, as shown in FIG. 5, when each of the discrete layers, the first FGS layer, and the second FGS layer is expressed as a 4×4 block, lower coefficients (i.e., coefficients of lower layers) that correspond to a coefficient 53 of the second FGS layer are a coefficient 52 of the first FGS layer and a coefficient 51 of the discrete layer. In particular, the coefficient 52 may be referred to as an "adjacent lower coefficient" that corresponds to the coefficient 53.

Figure 6A:
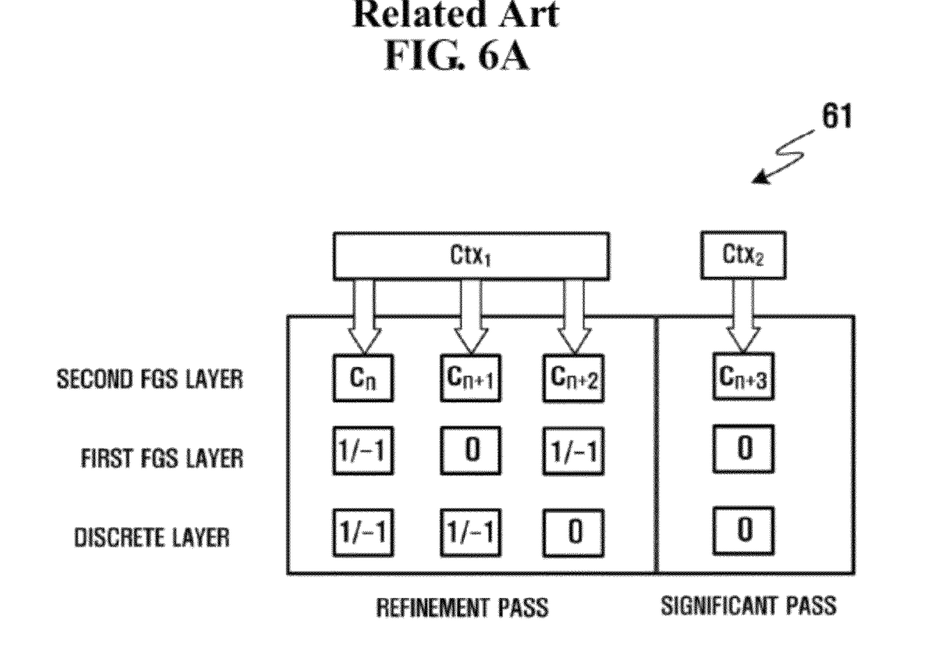
FIG. 6A is a view illustrating an FGS coding scheme in the SVC draft according to the related art.
Figure 6B:
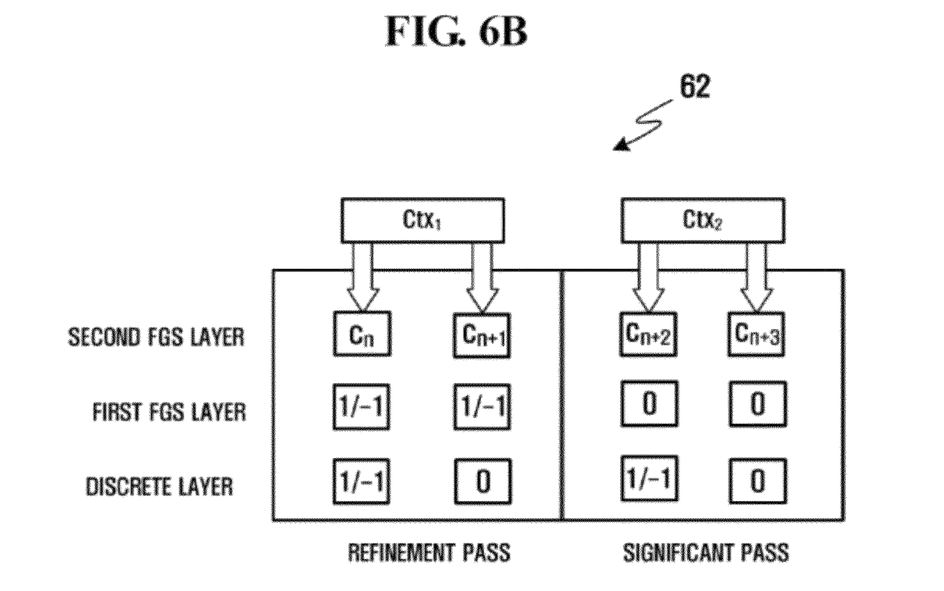
FIG. 6B is a view illustrating an FGS coding scheme according to a first exemplary embodiment of the invention.

FIGS. 6A and 6B are views comparing an FGS coding scheme 61 in the SVC draft in the related art and an FGS coding scheme 62 according to a first exemplary embodiment of the invention. In FIGS. 6A and 6B, "1/−1" indicates 1 or −1.

In FIG. 6A, a coding pass of each of the coefficients of the second FGS layer is determined as a refinement pass when there is at least one coefficient, whose value is not zero (1 or −1), among coefficients of the lower layers corresponding to each of the coefficients in the second FGS layer, and otherwise, as a significant pass. For example, in the case of each of the coefficients $c_n$, $c_{n+1}$, and $c_{n+2}$ among the coefficients of the second FGS layer, there is at least one coefficient, whose value is not zero, in the lower layers. Therefore, a coding pass of each of the coefficients $c_n$, $c_{n+1}$, and $c_{n+2}$ is determined as the refinement pass. In the case of the coefficient $c_{n+3}$, coefficients of the lower layers are all 0. Therefore, a coding pass thereof is determined as the significant pass. At this time, the same context model is applied in the same pass (when Context-adaptive Binary Arithmetic Coding (CABAC) is applied).

Therefore, the coefficients $c_n$, $c_{n+1}$ and $c_{n+2}$ that belong to the same refinement pass have the same context model $Ctx_1$.

As compared with FIG. 6A, in FIG. 6B, the coding pass of each of the coefficients of the second FGS layer is determined only by using a coefficient (an adjacent lower coefficient) of a layer (an adjacent lower layer) just below the second FGS layer. Therefore, when the coefficient of the layer just below the second FGS layer, that is, a coefficient corresponding to each of the coefficients of the first FGS layer is zero, the coding pass is determined as a significant pass, and otherwise, as a refinement pass. The determination is made regardless of which values the coefficients of the discrete layer have. Therefore, among the coefficients of the second FGS layer, the coefficients $c_n$ and $c_{n+1}$ are coded by the refinement pass, and the coefficients $c_{n+2}$ and $c_{n+3}$ are coded by the significant pass. At this time, the same context model is applied, in the same pass. Therefore, the coefficients $c_n$ and $c_{n+1}$ that belong to the refinement pass have the context model $Ctx_1$, and the coefficients $c_{n+2}$ and $c_{n+3}$ that belong to the significant pass have the context model $Ctx_2$.

Figure 7A:
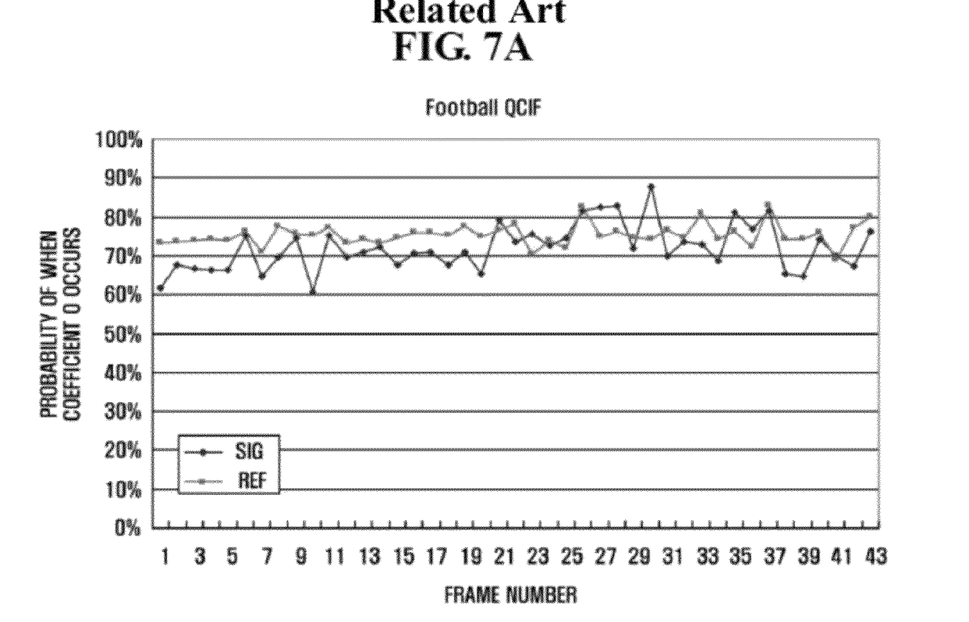
FIG. 7A is a graph illustrating probability of when a zero occurs according to coding passes that coefficients of a second FGS layer have when a QCIF Football sequence is encoded using JSVM-5.

FIG. 7A is an exemplary graph illustrating probability of when a zero occurs according to coding passes that coefficients of the second FGS layer have when a QCIF Football sequence is encoded using the Joint Scalable Video Model (JSVM)-5 according to the related art. According to the SVC draft in the related art, probability distributions are not clearly differentiated according to the coding passes in the second FGS layer or upper layers, which may affect the efficiency of entropy coding.

Figure 7B:
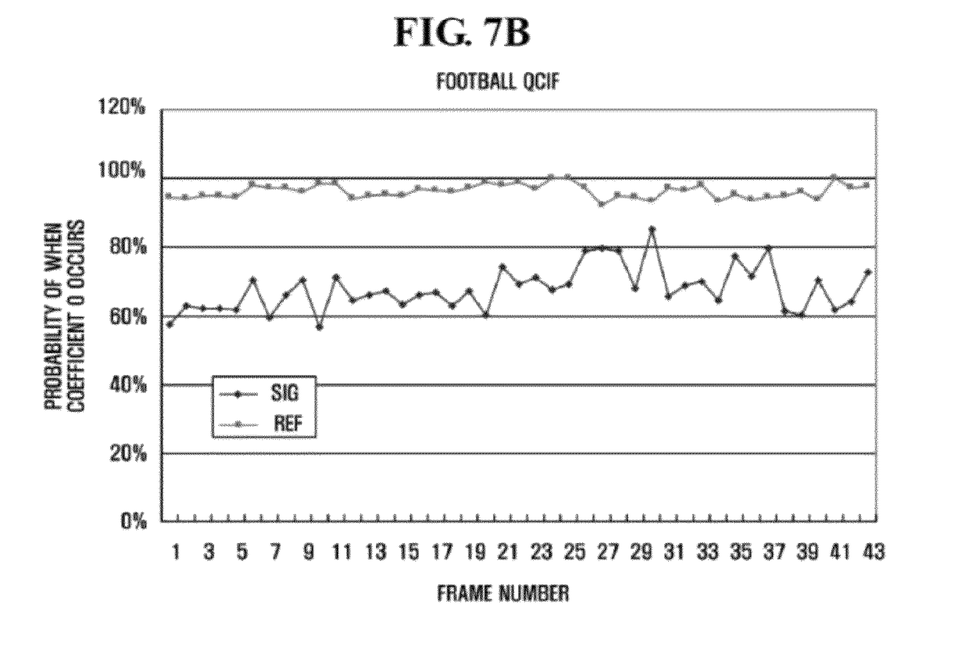
FIG. 7B is a graph illustrating probability of when a zero occurs according to coding passes that coefficients of a second FGS layer have when a QCIF Football sequence is encoded according to an exemplary embodiment of the invention.

FIG. 7B is an exemplary graph illustrating probability of when a zero occurs according to coding passes of the second FGS layer when a QCIF Football sequence is encoded according to an exemplary embodiment of the invention. In FIG. 7B, in the case of the refinement pass, the probability of when a zero occurs is approximately 100%, and in the case of the significant pass, the probability of when a zero occurs is in a range of 60 to 80%. As such, when the coding passes are determined by only using the coefficients of the adjacent lower layer, the probability distributions may be clearly differentiated according to the coding passes in the second FGS layer or upper layers.

Figure 8:
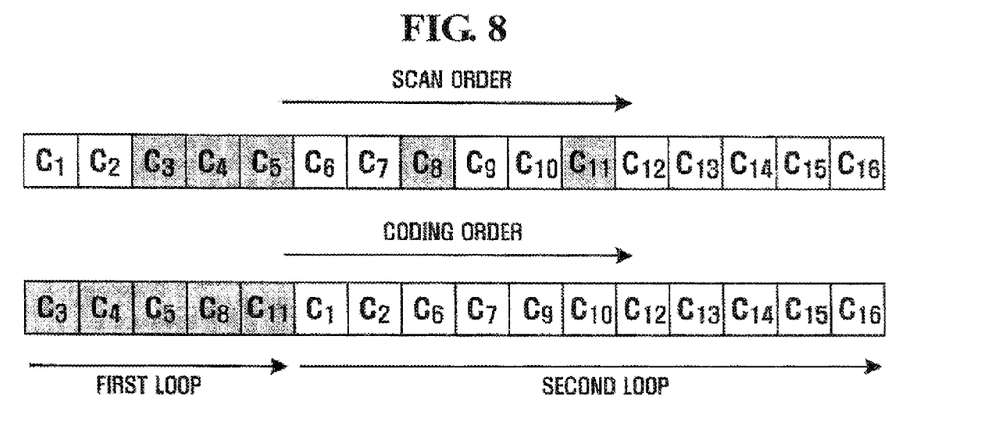
FIG. 8 is a view illustrating an example in which corresponding coefficients are collected according to a refinement pass and a significant pass and entropy coding is performed on the collected coefficients.

In the SVC draft according to the related art, after the refinement pass and the significant pass are determined as shown in FIG. 6A, the coefficients corresponding to each coding pass are collected and the entropy coding is performed on the collected coefficients, as shown in FIG. 8. The order of scanning the sixteen coefficients $c_1$ to $c_{16}$ included in the 4×4 block of the FGS layer is determined. When it is assumed that the coefficients $c_3$, $c_4$, $c_5$, $c_8$, and $c_{11}$ among the coefficients will be coded by the refinement pass, two loops are required when the entropy coding is performed on all of the sixteen coefficients. In the first loop, the sixteen coefficients are searched and the entropy coding is only performed on the coefficients corresponding to the refinement pass. In the second loop, the sixteen coefficients are searched again and the entropy coding is only performed on the coefficients corresponding to the significant pass. As such, the two loops are required when the entropy coding is performed, which may reduce operational speed in a video encoder or decoder.

Therefore, in the exemplary embodiment of the invention, in order to reduce the amount of operation of entropy coding according to the coding passes, the coefficients are not divided into groups on the basis of the coding passes as in the SVC draft according to the related art, but it is proposed that the entropy encoding be performed through one loop in scan order. That is, the entropy coding is performed on the corresponding coefficients in scan order regardless of whether the predetermined coefficient belongs to the refinement pass or the significant pass.

In order that the scheme of only using the adjacent lower coefficients as shown in FIG. 6B is applied to the conventional JSVM-5, a small amount of change in the syntax needs to be made. A function "base_luma_level (mbAddr, i8×8, i4×4, scanIdx)" is in the JSVM-5, and the function accumulates all values of coefficients of all of the lower layers that correspond to each of the current coefficients (i.e., predetermined coefficient of the current layer). Here, the parameters mbAddr, i8×8, 4×4, and scanIdx correspond to indexes for recognizing one coefficient included in the FGS layer. The parameters indicate an address of a macroblock, an index of a 8×8 block, an index of a 4×4 block, and a scan order index.

In the JSVM-5, when a value of the function is zero, it is determined that the current coefficient is coded by the significant pass, and when the value is not zero, it is determined that the current coefficient is coded by the refinement pass. In the JSVM-5, definition of the function is depicted in the pseudocode of Table 1.

TABLE 1 base_luma_level (mbAddr, i8x8, i4x4, scanIdx) is specified as follows.
   A variable i is set equal to 0.
   A variable result is set equal to 0.
   The return value of base_luma_level (mbAddr, i8x8, i4x4, scanIdx) is derived as follows.
   a.  The derivation process for base quality slices in subclause F.6.1 is invoked with mbAddr and baseQualityLevel equal to i as input and the output is assigned to baseQualitySlice [i].
   b.  When the transform coefficient level LumaLevel [4 * i8x8 + i4x4] [scanIdx] of the macroblock mbAddr is not equal to 0, the following applies
      The variable result is set equal to LumaLevel [4 * i8x8 + i4x4] [scanIdx].
      The derivation process is continued with step d.
   c.  When the variable i is less than (quality_level−1), the following applies.
      The variable i is incremented by 1: i = i + 1.
      The derivation process is continued with step a.
   d.  The return value of base_luma_level (mbAddr, i8x8, i4x4, scanIdx) is set equal to the value of the variable result.

According to the first exemplary embodiment of the invention as shown in FIG. 6B, Table 1 needs to be revised as the following Table 2.

TABLE 2 base_luma_level (mbAddr, i8x8, i4x4, scanIdx) is specified as follows.
   The return value of base_luma_level (mbAddr, i8x8, i4x4, scanIdx) is derived as follows.
   a.  The derivation process for base quality slices in subclause F.6.1 is invoked with mbAddr and baseQualityLevel equal to i as input and the output is assigned to baseQualitySlice [quality_level − 1].
   b.  The return value of base_luma_level(mbAddr, i8x8, i4x4, scanIdx) is set equal to LumaLevel [4 * i8x8 + i4x4][scanIdx].

In Table 2, the function base_luma_level( ) is newly defined to be equal to a value of the adjacent lower coefficient corresponding to the coefficient of the current FGS layer, that is, "LumaLevel[4*i 8x8+i4x4][scanIdx]". Here, the parameter "4*i8x8+i4x4" is a formula that is assigned such that indexes of the coefficients do not overlap. As such, in the first exemplary embodiment of the invention, by using the newly defined function base_luma_level( ), it is determined that when the value of this function is zero, the coding is performed using the significant pass, and otherwise, the refinement pass.

The method of determining the coding passes with respect to luminance components has been described with reference to Table 2. However, the same method may be applied with respect to chrominance components.

Figure 9:
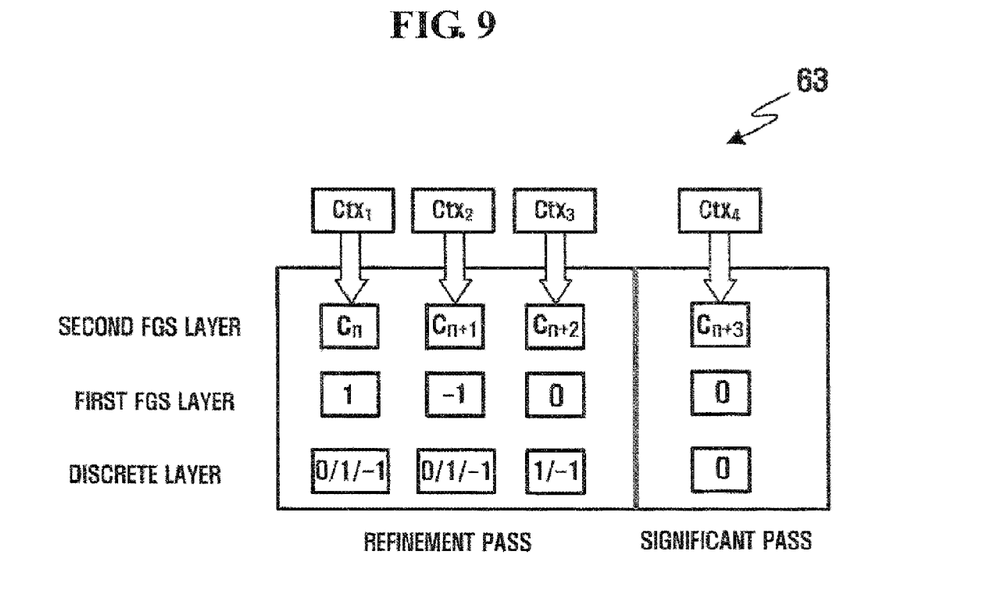
FIG. 9 is a view illustrating an FGS coding scheme according to a second exemplary embodiment of the invention.

FIG. 9 is a view illustrating an FGS coding scheme 63 according to a second exemplary embodiment of the invention. In the second exemplary embodiment, coding passes are determined in the same method as the JSVM according to the related art. That is, only when all of the coefficients of the lower layers corresponding to each of the current coefficients are zero, the coding pass of each of the coefficients is determined as the significant pass, and otherwise, as the refinement pass.

However, as described above, taking into account the fact that the current coefficient has high correlation with the adjacent lower coefficient corresponding to the current coefficient and thus, has a similar context characteristic to the adjacent lower coefficient, the context model of the current coefficient is determined based on the value of the adjacent lower coefficient. For example, a context model $Ctx_1$ is applied to a coefficient $c_n$ on the basis of an adjacent lower coefficient 1, a context model $Ctx_2$ is applied to a coefficient $c_{n+1}$ on the basis of an adjacent lower coefficient −1, and a context model $Ctx_3$ is applied to a coefficient $c_{n+2}$ on the basis of an adjacent lower coefficient 0. Herein, "0/1/−1" indicates 0, 1, or −1.

That is, when determining the coding passes, all of the lower coefficients in all of the lower layers corresponding to the current FGS layer are used. However, when determining the context model of each of the current coefficients included in each refinement pass, the adjacent lower coefficient is only used. In FIG. 6A, one context model is applied to all of the current coefficients included in the refinement pass. However, in the second exemplary embodiment shown, in FIG. 9, three context models are applied to the current coefficients included in the refinement pass according to the adjacent lower coefficients corresponding to the current coefficients. In the refinement pass, since the coefficients 1, −1, and 0 may have different context characteristics from each other, when the fractionized context models are applied, the efficiency of FGS coding may be increased.

Figure 10:
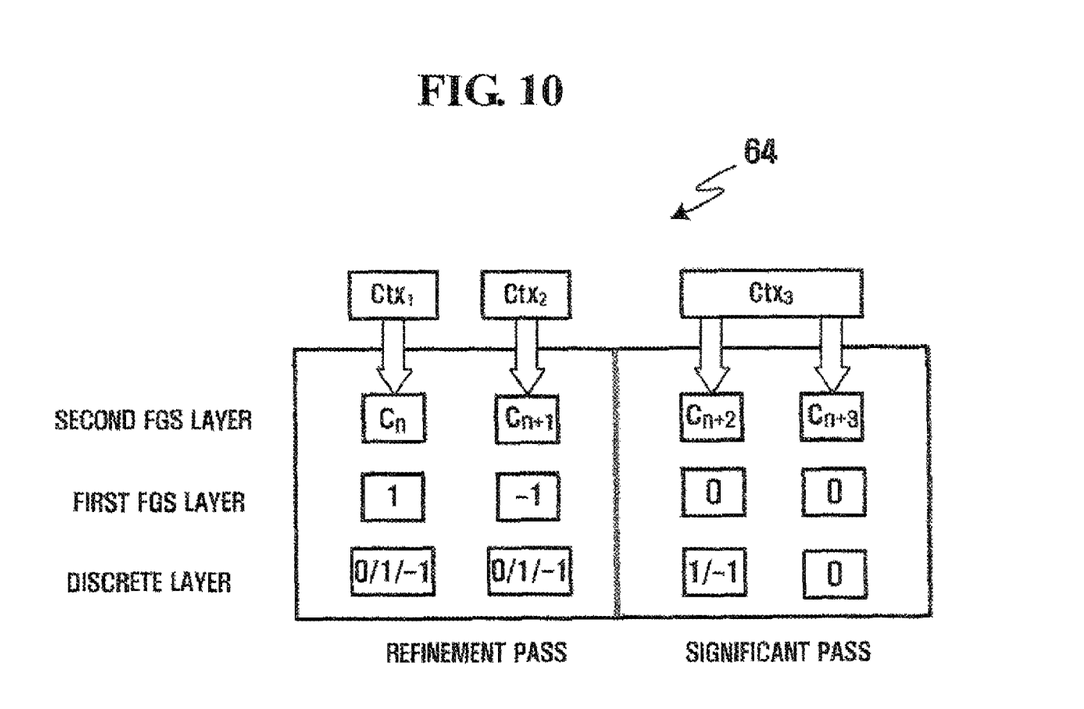
FIG. 10 is a view illustrating an FGS coding scheme according to a third exemplary embodiment of the invention.

FIG. 10 is a view illustrating an FGS coding scheme 64 according to a third exemplary embodiment of the invention. The third exemplary embodiment is different from the first exemplary embodiment in that different context models are applied to the current coefficients, each of which has a refinement pass, according to adjacent lower coefficients respectively corresponding to the current coefficients.

That is, the third exemplary embodiment is the same as the first exemplary embodiment in that coding passes are determined according to whether the adjacent lower coefficients are zero or not. However, the third exemplary embodiment is different from the first exemplary embodiment in that two context models $Ctx_1$ and $Ctx_2$ are applied to the current coefficients having the refinement pass according to whether the adjacent lower coefficients corresponding to the current coefficients having the refinement pass are 1 or −1. The current coefficients of when the adjacent lower coefficients are 1, and the current coefficients of when the adjacent lower coefficients are −1 may have different context characteristics. As such, the efficiency of FGS coding can be increased by applying the different context models.

In the above-described second and third exemplary embodiments, the description is made of the case where the plurality of context models are applied on the assumption that the refinement pass is coded using CABAC. However, when the refinement pass is coded using Context-adaptive Variable Length Coding (CAVLC), a plurality of VLC tables may be applied instead of using the plurality of context models.

As described above, in the exemplary embodiments of the invention, the description is made of the example in which one block includes one discrete layer and two FGS layers, and the second FGS layer is the current layer (i.e., a layer to be coded). However, the number of FGS layers may be increased, and a third FGS layer or upper layers may be the current layer.

Figure 11:
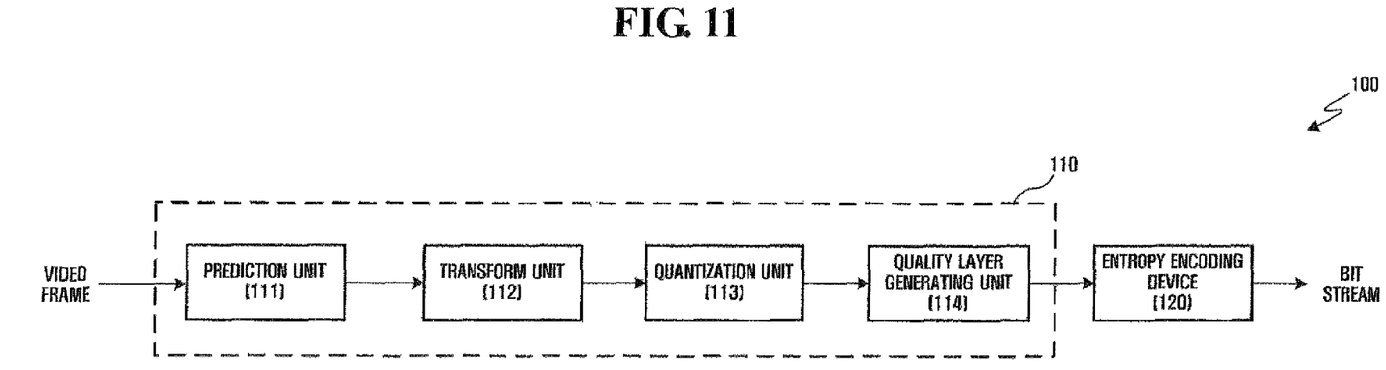
FIG. 11 is a block diagram illustrating a structure of a video encoder according to an exemplary embodiment of the invention.

FIG. 11 is a block diagram illustrating a structure of a video encoder 100 according to an exemplary embodiment of the invention. The video encoder 100 may include a frame encoding device 110 and an entropy encoding device 120.

The frame encoding device 110 generates from a video frame that is input, at least one quality layer related to the video frame.

To this end, the frame encoding device 110 may include a prediction unit 111, a transform unit 112, a quantization unit 113, and a quality layer generating unit 114.

The prediction unit 111 obtains a residual signal by subtracting an image, which is predicted according to a predetermined prediction method, from a current macroblock. The prediction method may include prediction schemes disclosed in the SVC draft, that is, inter prediction, directional intra, prediction, intra base prediction, and the like. The inter prediction may include a motion estimation process of obtaining a motion vector for expressing the relative motion between the current frame and a frame having the same resolution as and/or different temporal position from the current frame. The current frame may be predicted using a frame of a lower layer (a base layer) that exists in the same temporal position as the current frame and has different resolution from the current frame. This is called the intra base prediction. The intra base prediction does not include the motion estimation process.

The transform unit 112 transforms the obtained residual signal by using a spatial transform method, such as discrete cosine transform (DCT), wavelet transform, or the like so as to generate a transform coefficient. As a result of the spatial transform, the transform coefficient is obtained. When the DCT is used as the spatial transform method, a DCT coefficient is obtained, and when the wavelet transform is used, a wavelet coefficient is obtained.

The quantization unit 113 quantizes the transform coefficient obtained by the spatial transform unit 112 so as to generate a quantization coefficient. The quantization means a process in which the transform coefficient expressed as an arbitrary real number is divided into predetermined intervals so as to be expressed as discrete values. The quantization process includes scalar quantization, vector quantization, and the like.

The quality layer generating unit 114 generates a plurality of quality layers by the process described in FIG. 3. The plurality of quality layers may include one discrete layer and at least one FGS layer. Independent encoding/decoding is performed on the discrete layer, but encoding/decoding is performed on the FGS layer according to another layer.

Figure 12:
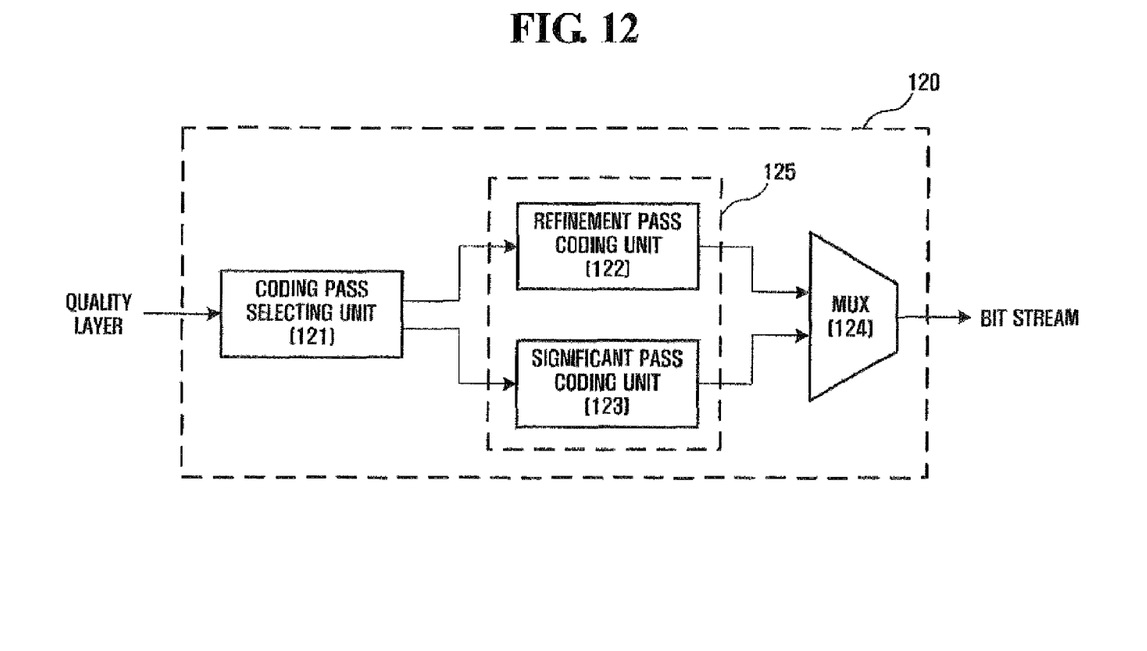
FIG. 12 is a block diagram illustrating a detailed structure of an entropy encoding device included in the video encoder of FIG. 11.

The entropy encoding device 120 performs an independent lossless encoding process according to the exemplary embodiment of the invention. A detailed structure of the entropy encoding device 120 is shown in FIG. 12. Referring to FIG. 12, the entropy encoding device 120 may include a coding pass selecting unit 121, a refinement pass coding unit 122, a significant pass coding unit 123, and a multiplexer (MUX) 124.

The coding pass selecting unit 121 determines a coding pass of each of the coefficients included in the current block (4×4 block, 8×8 block, or 16×16 block) mat belongs to the quality layer. Further, the coding pass selecting unit 121 may determine context models or VLC tables that may be used for the refinement pass coding.

The method of determining the coding passes and the method of determining the context models will be performed according to the first, second, and third exemplary embodiments of the invention.

According to the first exemplary embodiment of the invention, the coding pass selecting unit 121 determines the coding pass (refinement pass or significant pass) of each of the current coefficients, only using an adjacent lower coefficient corresponding to each of the current coefficients. That is, the coding pass of each of the current coefficients is determined as the significant pass when the corresponding coefficient is zero, and otherwise, as the refinement pass. At this time, one context model (or one VLC table) is applied to all of the current coefficients whose coding passes are determined as the refinement passes.

According to the second exemplary embodiment, the coding pass selecting unit 121 selects the coding pass by using coefficients of all lower layers corresponding to each of the current coefficients of the current layer. When at least one coefficient being used has a value except for zero, the coding pass of each of the current coefficients is determined as the refinement pass, and otherwise, as the significant pass. At this time, different context models (or VLC tables) are applied to the current coefficients whose coding passes are determined as the refinement passes, according to the value (1, 0, or −1) of the adjacent lower coefficient corresponding to each of the current coefficients.

According to the third exemplary embodiment, like the first exemplary embodiment, the coding pass selecting unit 121 only refers to the adjacent lower coefficient corresponding to each of tire current coefficients and determines the coding pass whether the adjacent lower coefficient has a value except for zero. Here, different context models (or VLC tables) are applied to the current coefficients whose coding passes are determined as the refinement passes, according to the value (1 or −1) of the adjacent coefficient value being used.

A pass coding unit 125 performs a lossless encoding (entropy encoding) process on the coefficients of the current block according to the selected coding passes. To this end, the pass coding unit 125 includes the refinement pass coding unit 122 that performs a lossless encoding process on the current coefficients whose coding passes are determined as the refinement passes by the coding pass selecting unit 121, by using a refinement pass coding scheme, and the significant pass coding unit 123 that performs a lossless encoding process on the current coefficients whose coding passes are determined as the significant passes by the coding pass selecting unit 121, by using a significant pass coding scheme.

A detailed method of entropy coding according to the actual refinement pass or significant pass may be performed using the same method used in the conventional SVC draft.

In particular, the JVT-P056, which is a proposal document for the SVC, proposes the following coding scheme for the significant pass. A characteristic of a codeword, which is an encoded result, is determined by a cut-off parameter "m". A symbol "C" to be coded is equal to or smaller than the parameter m, the symbol C is encoded using a code Exp_Golomb.

When the symbol C is larger than the parameter m, the symbol C is divided into two parts, that is, length and suffix according to Equation 1, and then encoded.

$$P = \left[\frac{C-m}{3}\right] + m \qquad \text{[Equation 1]}$$

The P indicates the encoded codeword, which includes the length and the suffix (which has a value of 00, 10, or 10).

Meanwhile, the refinement pass coding scheme may include CABAC or CAVLC. The refinement pass coding unit 122 collects the current coefficients that have the same context model determined by the coding pass selecting unit 121, and performs binary arithmetic encoding on the collected coefficients by using the context model (CABAC). Alternatively, the refinement pass coding unit 122 collects the current coefficients that have the same VLC table determined by the coding pass selecting unit 121, and performs variable length encoding on the collected current coefficients by using the VLC table (CAVLC).

The CABAC is a process in which a probability model is selected with respect to predetermined coefficients to be coded and arithmetic coding is performed on the coefficients. In general, the CABAC process includes binarization, context model selection, arithmetic coding, and probability updating.

The CAVLC is a scheme in which coefficients having predetermined lengths that will be coded are converted into codewords having different, lengths by using the VLC table.

The MUX 124 multiplexes an output of the refinement pass coding unit 122 an and output of the significant pass coding unit 123 so as to output one bit stream.

Figure 13:
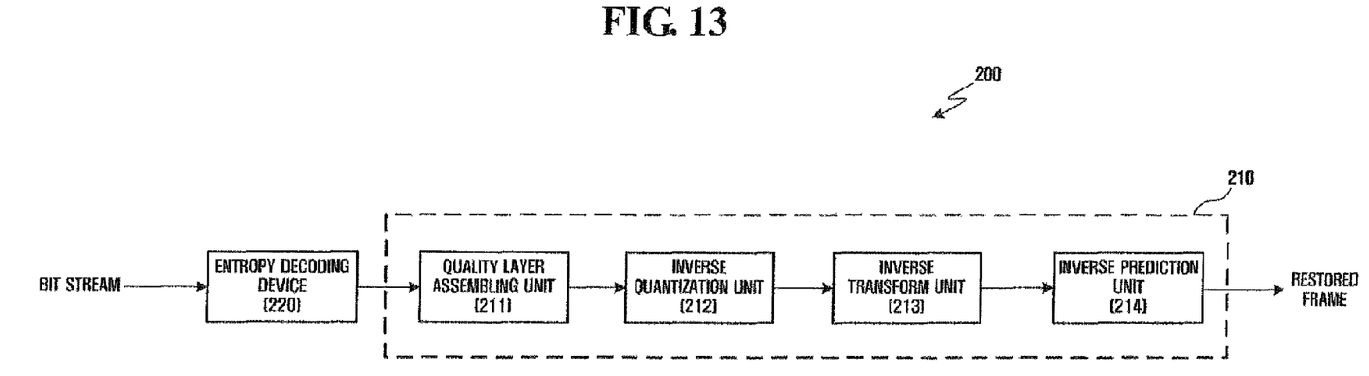
FIG. 13 is a block diagram illustrating a structure of a video decoder according to an exemplary embodiment of the invention.

FIG. 13 is a block diagram illustrating a structure of a video decoder 200 according to an exemplary embodiment of the invention. The video decoder 200 includes an entropy decoding device 220 and a frame decoding device 210.

The entropy decoding device 220 performs entropy decoding on the coefficients of the current block that belong to at least one quality layer included in the input bit stream according to the exemplary embodiment of the invention. A detailed structure of the entropy decoding device 220 will be described below with reference to FIG. 14.

The frame decoding device 210 restores an image of the current block from the coefficients of die current block that are losslessly decoded by the entropy decoding device 220. To this end, the frame decoding device 210 includes a quality layer assembling unit 211, an inverse quantization unit 212, an inverse transform unit 213, and an inverse prediction unit 214.

The quality layer assembling unit 211 adds a plurality of quality layers as shown in FIG. 1 so as to generate one slice data or frame data.

The inverse quantization unit 212 inversely quantizes the data supplied from the quality layer assembling unit 211.

The inverse transform unit 213 inversely transforms the inversely quantized result. The inverse transform is performed inversely to the transform process performed in the transform unit 112 of FIG. 11.

The inverse prediction unit 214 adds the restored residual signal supplied from the inverse transform unit 213 and a prediction signal so as to restore the video frame. At this time, the prediction signal may be obtained using inter prediction or intra base prediction like the video encoder stage.

Figure 14:
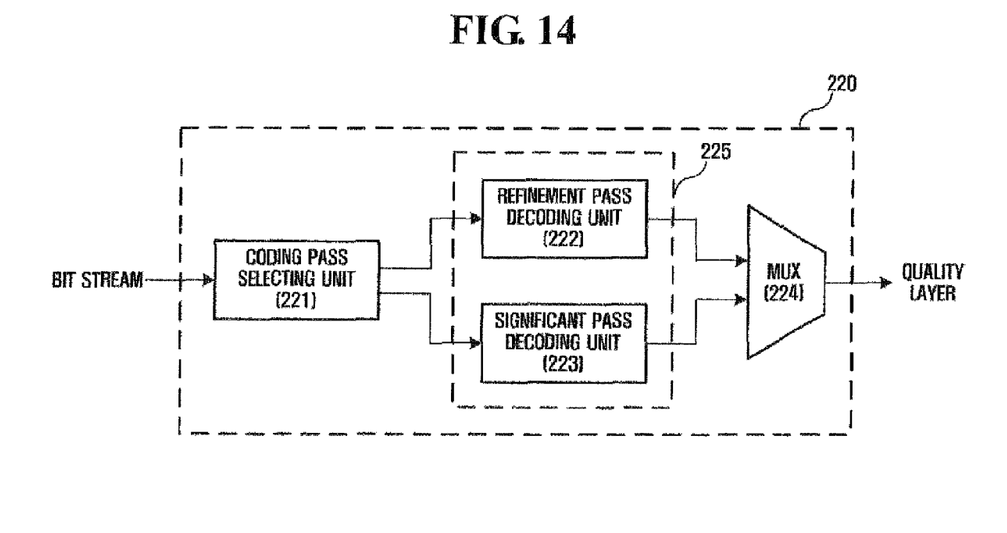
FIG. 14 is a block diagram illustrating a detailed structure of an entropy decoding device included in the video decoder of FIG. 13.

FIG. 14 is a block diagram illustrating a detailed structure of the entropy decoding device 220. The entropy decoding device 220 may include a coding pass selecting unit 221, a refinement pass decoding unit 222, a significant pass decoding unit 223, and a MUX 224.

The coding pass selecting unit 221 determines a coding pass of each of the encoded coefficients (encoded current coefficients) included in the current block (4×4 block, 8×8 block, or 16×16 block) that belongs to the quality layer. Further, the coding pass selecting unit 221 may determine context models or VLC tables to be applied to the refinement pass coding. The method of determining the coding passes and the method of determining the context models are performed according to the first, second, and third exemplary embodiments of the invention as described above.

A pass decoding unit 225 losslessly decodes the current coefficients according to the selected coding passes. To this end, the pass decoding unit 225 includes the refinement pass decoding unit 222 that losslessly decodes the current coefficients whose coding passes are determined as the refinement passes by the coding pass selecting unit 221, by using a refinement pass decoding scheme, and the significant pass decoding unit 223 that losslessly decodes the current coefficients whose coding passes are determined as the significant passes by the coding pass selecting unit 221, according to a significant pass decoding scheme.

The refinement pass decoding unit 222 collects the current coefficients having the same context model determined by the coding pass selecting unit 221, and performs binary arithmetic decoding on the collected coefficients by using the context model (CABAC). Alternatively, the refinement pass decoding unit 222 collects the current coefficients having the same VLC table determined by the coding pass selecting unit 221, and performs variable length decoding on the collected coefficients by using the VLC table.

The MUX 224 multiplexes an output of the refinement pass decoding unit 222 and an output of the significant pass decoding unit 223 so as to generate data (slice or frame) with respect to one quality layer.

The respective components shown in FIGS. 11 to 14 may be implemented by software, such as tasks, classes, subroutines, processes, objects, executing threads, programs, and the like, which can be executed in a predetermined region of a memory, or hardware, such as a Field Programmable Gate Array (FPGA) or an Application Specific Integrated Circuit (ASIC), or a combination of the hardware and the software. The respective components may be contained in storage media readable by a computer or portions thereof may be distributed in a plurality of computers.

Although the present invention has been described in connection with the exemplary embodiments thereof, it will be apparent to those skilled in the art that various modifications and changes may be made thereto without departing from the scope and spirit of the invention. Therefore, it should be understood that the above exemplary embodiments are not limitative, but illustrative in all aspects.

According to the exemplary embodiments of the invention, it is possible to improve entropy coding efficiency of video data that includes a plurality of quality layers.

Further, according to the exemplary embodiments of the invention, it is possible to reduce computational complexity when performing entropy encoding on video data that includes a plurality of quality layers.

What is claimed is:

1. A method of entropy encoding a plurality of current coefficients of a quality layer among a plurality of quality layers of an image block divided into the plurality of quality layers, the method comprising:

determining a coding pass with respect to each of the current coefficients;

a context model among a plurality of context models with respect to each of the current coefficients using an adjacent lower coefficient of an adjacent lower layer corresponding to a respective one of the current coefficients, wherein the context model is determined independently of coefficients of lower layers other than the adjacent lower layer; and encoding a group of coefficients having a same selected context model among the current coefficients using the selected context model, wherein the plurality of quality layers are layered in succession on top of one another, and the plurality of quality layers comprise a plurality of lower layers which are lower than the quality layer, and the adjacent lower layer is one of the plurality of layers and is adjacently below the quality layer.

2. The method of claim 1, wherein the plurality of quality layers comprise one discrete layer and a plurality of fine granular scalability layers.

3. The method of claim 1, wherein the coding pass is determined according to whether all lower coefficients corresponding to each of the current coefficients are zero.

4. The method of claim 1, wherein the coding pass is determined according to whether the adjacent lower coefficient of the adjacent lower layer corresponding to each of the current coefficients is zero, wherein the coding pass is determined independently of coefficients of lower layers other than the adjacent lower layer.

5. The method of claim 1, wherein the at least one lower coefficient is an adjacent lower coefficient corresponding to each of the current coefficients.

6. The method of claim 5, wherein a value of the adjacent lower coefficient is 1, 0 or −1, and three candidate models exist for the context model.

7. The method of claim 5, wherein a value of the adjacent lower coefficient is 1 or −1, and two candidate models exist for the context model.

8. A method of entropy decoding a plurality of encoded current coefficients of a quality layer among a plurality of quality layers of an image block divided into the plurality of quality layers, the method comprising:

determining a coding pass with respect to each of the encoded current coefficients;

selecting a context model among a plurality of context models with respect to each of the encoded current coefficients using an adjacent lower coefficient of an adjacent lower layer corresponding to a respective one of the encoded current coefficients if the coding pass is a refinement pass, wherein the context model is determined independently of coefficients of lower layers other than the adjacent lower layer; and decoding a group of coefficients having a same selected context model among the encoded current coefficients using the same selected context model, wherein the plurality of quality layers are layered in succession on top of one another, and the plurality of quality layers comprise a plurality of lower layers which are lower than the quality layer, and the adjacent lower layer is one of the plurality of layers and is adjacently below the quality layer.

9. The method of claim 8, wherein the plurality of quality layers comprise one discrete layer and a plurality of FGS layers.

10. The method of claim 8, wherein the coding pass is determined according to whether all lower coefficients corresponding to each of the encoded current coefficients are zero.

11. The method of claim 8, wherein the coding pass is determined according to whether the adjacent lower coefficient of the adjacent lower layer corresponding to each of the encoded current coefficients is zero, wherein the coding pass is determined independently of coefficients of lower layers other than the adjacent lower layer.

12. The method of claim 8, wherein the at least one lower coefficient is an adjacent lower coefficient corresponding to each of the encoded current coefficients.

13. The method of claim 12, wherein a value of the adjacent lower coefficient is 1, 0 or −1, and three candidate models exist for the context model.

14. The method of claim 12, wherein a value of the adjacent lower coefficient is 1 or −1, and two candidate models exist for the context model.

15. A method of entropy encoding a plurality of current coefficients of a quality layer among a plurality of quality layers of an image block divided into the plurality of quality layers, the method comprising:

determining a coding pass with respect to each of the current coefficients;

selecting a variable length coding (VLC) table among a plurality VLC tables with respect to the current coefficients using an adjacent lower coefficient of an adjacent lower layer corresponding to a respective one of the current coefficients, wherein the VLC table is determined independently of coefficients of lower layers other than the adjacent lower layer; and performing a variable length encoding process on a group of coefficients having a same selected context model among the current coefficients using the selected VLC table, wherein the plurality of quality layers are layered in succession on top of one another, and the plurality of quality layers comprise a plurality of lower layers which are lower than the quality layer, and the adjacent lower layer is one of the plurality of layers and is adjacently below the quality layer.

16. The method of claim 15, wherein the coding pass is determined according to whether all lower coefficients corresponding to each of the current coefficients are zero.

17. The method of claim 15, wherein the coding pass is determined according to whether the adjacent lower coefficient of the adjacent lower layer corresponding to each of the current coefficients is zero, wherein the coding pass is determined independently of coefficients of lower layers other than the adjacent lower layer.

18. The method of claim 15, wherein the at least one lower coefficient is an adjacent lower coefficient corresponding to each of the current coefficients.

19. A method of entropy decoding a plurality of encoded current coefficients of a quality layer among a plurality of quality layers of an image block divided into the plurality of quality layers, the method comprising:

determining a coding pass with respect to each of the encoded current coefficient;

selecting a variable length coding (VLC) table among a plurality of VLC tables with respect to each of the encoded current coefficients using an adjacent lower coefficient of an adjacent lower layer corresponding to a respective one of the encoded current coefficients, wherein the VLC table is determined independently of coefficients of lower layers other than the adjacent lower layer; and performing variable length decoding on a group of coefficients having the same selected context model among the encoded current coefficients by using the selected VLC table, wherein the plurality of quality layers are layered in succession on top of one another, and the plurality of quality layers comprise a plurality of lower layers which are lower than the quality layer, and the adjacent lower layer is one of the plurality of layers and is adjacently below the quality layer.

20. The method of claim 19, wherein the coding pass is determined according to whether all lower coefficients corresponding to each of the encoded current coefficients are zero.

21. The method of claim 19, wherein the coding pass is determined according to whether the adjacent lower coefficient of the adjacent lower layer corresponding to each of the encoded current coefficients is zero, wherein the coding pass is determined independently of coefficients of lower layers other than the adjacent lower layer.

22. The method of claim 19, wherein the at least one lower coefficient is an adjacent lower coefficient corresponding to each of the encoded current coefficients.

23. An apparatus for entropy encoding a plurality of current coefficients of a quality layer among a plurality of quality layers of an image block divided into the plurality of quality layers, the apparatus comprising:

a hardware processor;

a unit which determines a coding pass with respect to each of the current coefficients;

a unit which selects a context model among a plurality of context models with respect to each of the current coefficients using an adjacent lower coefficient of an adjacent lower layer corresponding to a respective one of the current coefficients, wherein the context model is determined independently of coefficients of lower layers other than the adjacent lower layer; and a unit which performs arithmetic encoding on a group of coefficients having a same selected context model among the current coefficients using the selected context model, wherein the plurality of quality layers are layered in succession on top of one another, and the plurality of quality layers comprise a plurality of lower layers which are lower than the quality layer, and the adjacent lower layer is one of the plurality of layers and is adjacently below the quality layer.

24. An apparatus for entropy decoding a plurality of encoded current coefficients of in a layer among a plurality of quality layers of an image block divided into the plurality of quality layers, the apparatus comprising:

a hardware processor;

a unit which determines a coding pass with respect to each of the encoded current coefficients;

a unit which selects a context model among a plurality of context models with respect to each of the encoded current coefficients using an adjacent lower coefficient of an adjacent lower layer corresponding to a respective one of the encoded current coefficients, wherein the context model is determined independently of coefficients of lower layers other than the adjacent lower layer; and a unit which performs arithmetic decoding on a group of coefficients having a same selected context model among the encoded current coefficients by using the selected context model, wherein the plurality of quality layers are layered in succession on top of one another, and the plurality of quality layers comprise a plurality of lower layers which are lower than the quality layer, and the adjacent lower layer is one of the plurality of layers and is adjacently below the quality layer.

* * * * *